United States Patent
Miyagi (10) Patent No.: US 9,099,043 B2
(45) Date of Patent: Aug. 4, 2015

(54) LIGHT SOURCE APPARATUS, ELECTRONIC DEVICE, AND CONTROL METHODS THEREFOR

(71) Applicant: CANON KABUSHIKI KAISHA, Tokyo (JP)

(72) Inventor: Tatsuya Miyagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/750,485

(22) Filed: Jan. 25, 2013

(65) Prior Publication Data
US 2013/0194318 A1 Aug. 1, 2013

(30) Foreign Application Priority Data

Jan. 31, 2012 (JP) ................................. 2012-018190
Nov. 20, 2012 (JP) ................................. 2012-254183

(51) Int. Cl.
*G09G 5/10* (2006.01)
*H05B 37/02* (2006.01)
*G09G 3/34* (2006.01)
*H02M 7/217* (2006.01)

(52) U.S. Cl.
CPC ............. *G09G 3/3406* (2013.01); *H02M 7/217* (2013.01); *G09G 2320/0633* (2013.01)

(58) Field of Classification Search
CPC ..................... G09G 3/3406; G09G 2320/0633
USPC .............. 345/690; 349/42; 315/224; 313/569
See application file for complete search history.

(56) References Cited

U.S. PATENT DOCUMENTS

| 4,672,266 A * | 6/1987 | Taniguchi et al. ............. 313/509 |
| 8,823,276 B2 * | 9/2014 | Cho et al. ........................ 315/224 |
| 2007/0146565 A1 * | 6/2007 | Jeon et al. ........................ 349/42 |

FOREIGN PATENT DOCUMENTS

JP        2002-043089        2/2002

\* cited by examiner

*Primary Examiner* — Kumar Patel
*Assistant Examiner* — Kuo Woo
(74) *Attorney, Agent, or Firm* — Cowan, Liebowitz & Latman, P.C.

(57) ABSTRACT

A light source device including: a boost-type conversion unit configured to convert an input AC voltage into a DC voltage; a detection unit configured to detect a voltage value of the input AC voltage; and a control unit configured to control the brightness of a light source unit on the basis of an input image signal. The control unit changes the timing of brightness change of the light source unit according to a voltage value detected by the detection unit.

12 Claims, 8 Drawing Sheets

WAVEFORM OF LOAD CURRENT SUPPLIED TO BACKLIGHT

LIGHT SOURCE APPARATUS, ELECTRONIC DEVICE, AND CONTROL METHODS THEREFOR

BACKGROUND OF THE INVENTION

1. Field of the Invention

The present invention relates to a light source apparatus, an electronic device, and a control method therefor.

2. Description of the Related Art

Figure 8A:
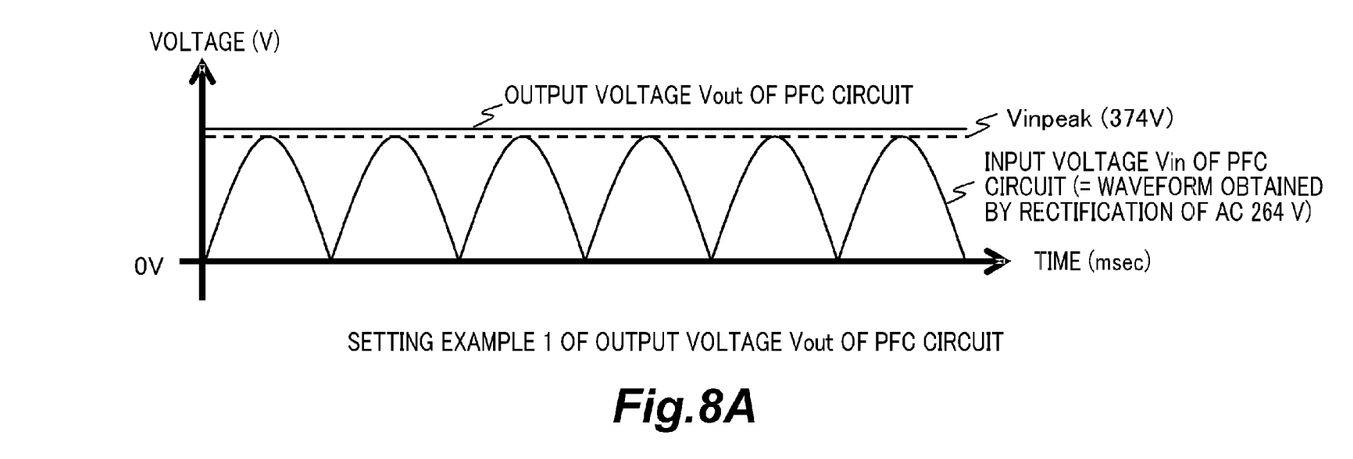
FIG. 8A shows a setting example 1 of output voltage Vout of pfc circuit.

A power factor correction (PFC) circuit has been used for suppressing harmonic current in display devices requiring high-capacity power sources. In the case of a PFC circuit constituted by a boost-type converter, the output voltage Vout of the PFC circuit should be set to a value higher than the peak voltage Vinpeak of the input voltage Vin of the PFC circuit (see FIG. 8A).

This is because when the output voltage Vout of the PFC circuit is equal to the input voltage Vin of the PFC circuit, the PFC circuit stops and the harmonic current cannot be suppressed. The peak voltage Vinpeak of the input voltage Vin of the PFC circuit, as referred to herein, is a peak value (about 374 V) of the pulsating voltage after the maximum value (for example, AC 264 V) of the voltage supplied form the commercial power source has been rectified.

Meanwhile, in order to reduce the rated voltage of the output capacitor used in the PFC circuit or reduce the difference in electric potential between the primary and secondary sides, it is preferred that a lower output voltage Vout of the PFC circuit be obtained.

Figure 8B:
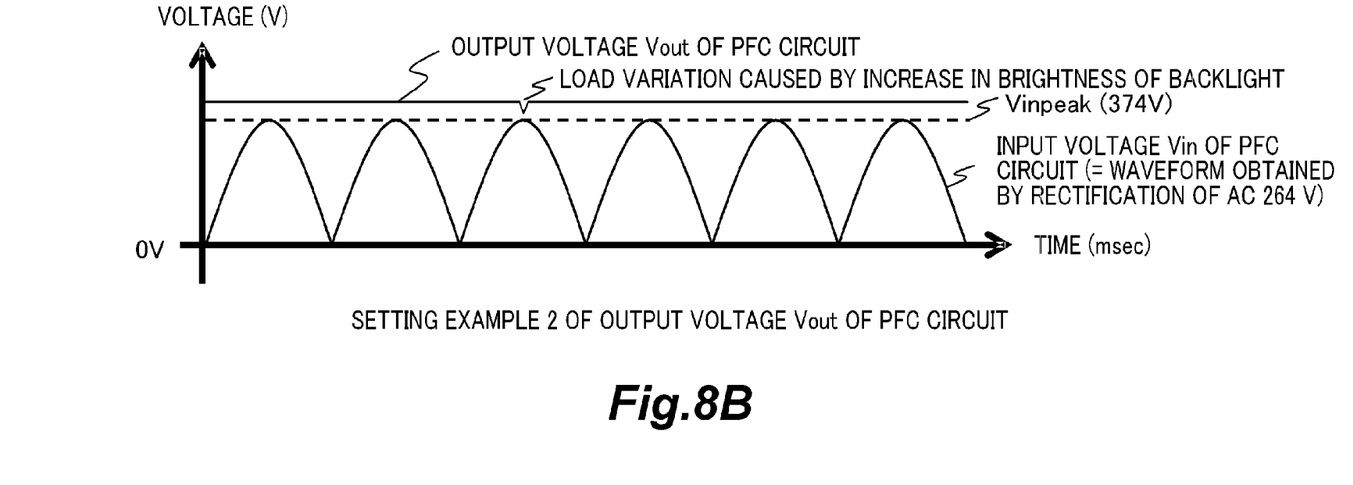
FIG. 8B shows a setting example 2 of output voltage Vout of pfc circuit.

However, when the load current of the PFC circuit changes abruptly due to increase in brightness of a backlight (light source) installed in a display device, load fluctuations occur and the output voltage Vout of the PFC circuit decreases. Therefore, it is necessary that the output voltage Vout be set to a value sufficiently higher than the peak voltage Vinpeak of the input voltage Vin of the PFC circuit (see FIG. 8B).

A method of dividing a backlight into a plurality of regions and shifting the ON/OFF timing for each region has been suggested as a method for suppressing the decrease in the output voltage Vout of the PFC circuit (see, for example, Japanese Patent Application Publication No. 2002-43089).

Further, taking into account that the backlight brightness is changed with a constant period, a method can be considered by which backlight brightness variations are synchronized with the commercial power supply frequency and the backlight brightness is prevented from changing in the vicinity of the peak voltage Vinpeak of the input voltage Vin of the PFC circuit. However, such synchronization is actually difficult to achieve because of a spread in the commercial power supply frequency and also because the commercial power supply frequency varies depending on a region (50 Hz/60 Hz).

However, with the above-described conventional technique, a high output voltage Vout should be set with consideration for the decrease in the output voltage Vout of the PFC circuit following the increase in backlight brightness. Therefore, a large-size output capacitor with a high rated voltage is necessary for the PFC circuit and the power source for a display device is difficult to miniaturize. Further, since the difference in voltage between the primary and secondary sides is increased when the output voltage Vout of the PFC circuit increases, a large insulation distance should be ensured and the power source for a display device is difficult to miniaturize.

SUMMARY OF THE INVENTION

Accordingly, the present invention provides a technique that makes it possible to miniaturize a light source device or an electronic device having a boost-type conversion unit configured to convert the inputted AC voltage into a DC voltage.

The first aspect of the present invention resides in a light source device including:

a boost-type conversion unit configured to convert an input AC voltage into a DC voltage;

a detection unit configured to detect a voltage value of the input AC voltage; and a control unit configured to control a brightness of a light source unit on the basis of an input image signal, wherein the control unit changes a timing of brightness change of the light source unit according to a voltage value detected by the detection unit.

The second aspect of the present invention resides in an electronic device including:

a boost-type conversion unit configured to convert an input AC voltage into a DC voltage;

a detection unit configured to detect a voltage value of the input AC voltage; and a control unit configured to suppress changes in a current of a load to which the DC voltage is supplied, according to a voltage value detected by the detection unit.

The third aspect of the present invention resides in a control method for a light source device provided with a boost-type conversion unit configured to convert an input AC voltage into a DC voltage, the control method comprising:

a detection step of detecting a voltage value of the input AC voltage; and a control step of controlling a brightness of a light source unit on the basis of an input image signal, wherein in the control step, a timing of brightness change of the light source unit is changed according to a voltage value detected in the detection step.

The fourth aspect of the present invention resides in a control method for an electronic device including a boost-type conversion unit configured to convert an input AC voltage into a DC voltage, the control method comprising:

a detection step of detecting a voltage value of the input AC voltage; and a control step of suppressing changes in a current of a load to which the DC voltage is supplied, according to a voltage value detected in the detection step.

The present invention makes it possible to miniaturize a light source device or an electronic device having a boost-type conversion unit configured to convert the inputted AC voltage into a DC voltage.

Further features of the present invention will become apparent from the following description of exemplary embodiments with reference to the attached drawings.

BRIEF DESCRIPTION OF THE DRAWINGS

FIG. 3 is a waveform diagram according to Embodiment 1.

FIG. 6 is a waveform diagram according to Embodiment 2.

FIG. 8 is a waveform diagram according to the related art.

DESCRIPTION OF THE EMBODIMENTS

Embodiment 1

The first embodiment of the present invention will be explained below with reference to the attached drawings.

The case in which the brightness change timing of a backlight is shifted within a period in which the detected value of the voltage inputted to the PFC circuit in a display device equipped with the backlight exceeds a threshold will be described below as the first embodiment.

Figure 1:
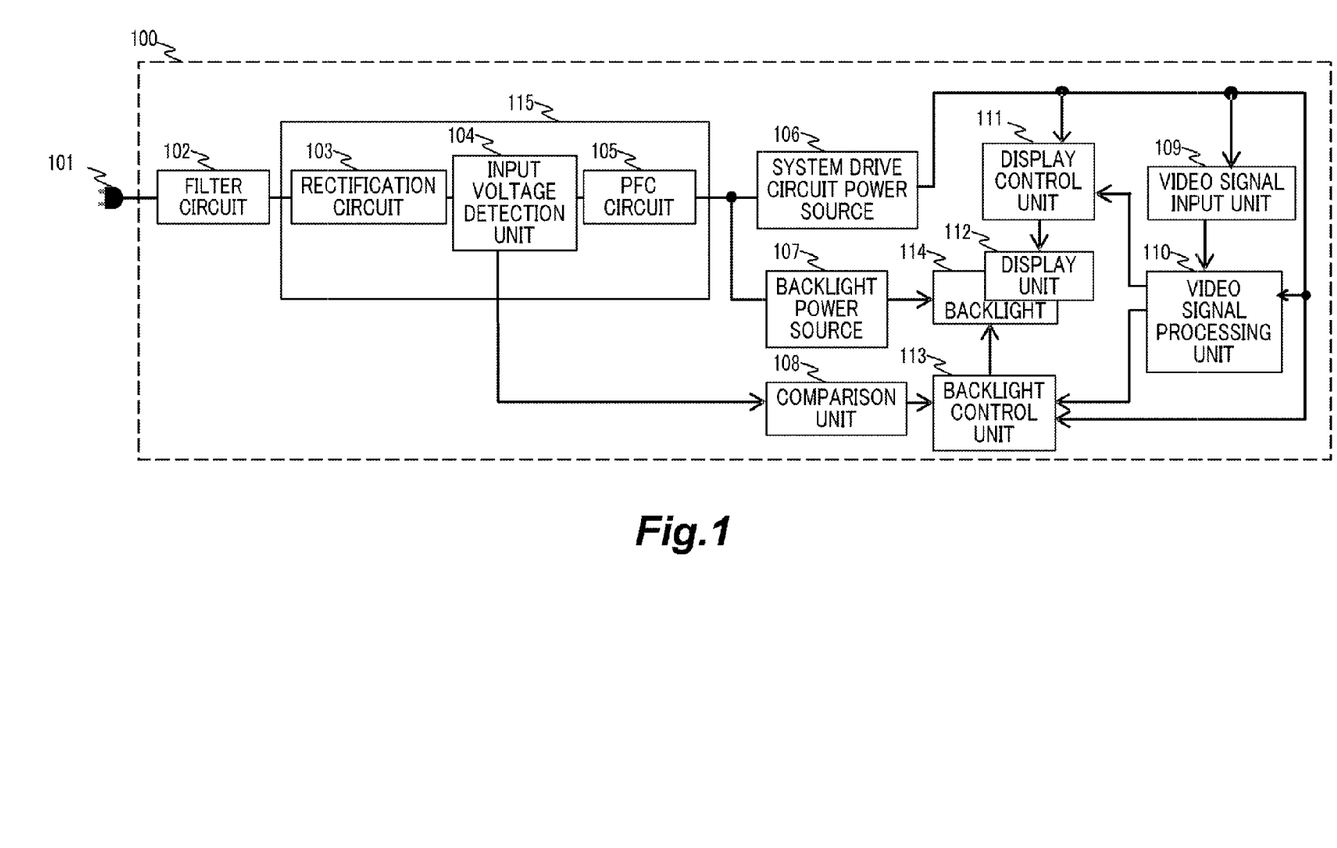
FIG. 1 is a block diagram illustrating the schematic configuration of the display device according to Embodiment 1.

FIG. 1 is a block diagram illustrating the schematic configuration of the display device equipped with a backlight (light source unit) according to the first embodiment. As shown in FIG. 1, a display device 100 includes a filter circuit 102, a rectification circuit 103, an input voltage detection unit 104, a PFC circuit 105, a system drive circuit power source 106, a backlight power source 107, a comparison unit 108, a video signal input unit 109, a video signal processing unit 110, a display control unit 111, a display unit 112, a backlight control unit 113, and a backlight 114 and is connected to a commercial power source by a power source plug 101. In this case, it is assumed that a transmission-type liquid crystal panel using the backlight 114 disposed on the rear surface as a light source is used as the display unit 112. Further, a light source such as a light emitting diode (LED) or cold cathode fluorescent lamp (CCFL) is used as the backlight 114. The brightness of the backlight 114 can be changed, and the brightness thereof is controlled by the backlight control unit 113. The rectification circuit 103, input voltage detection unit 104, and PFC circuit 105 constitute a boost-type AC-DC conversion unit 115 converting the inputted AC power (AC voltage) into DC power (DC voltage).

Figure 2:
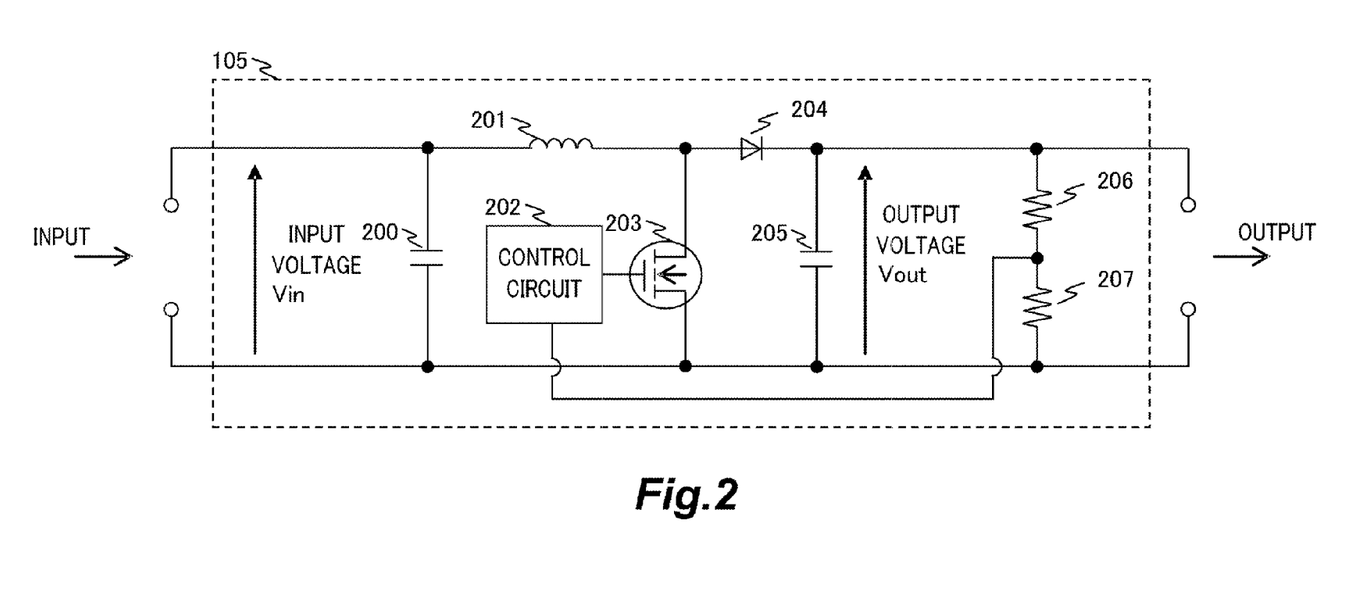
FIG. 2 is a simplified circuit diagram illustrating the configuration of the PFC circuit according to Embodiment 1.

FIG. 2 is a simplified circuit diagram illustrating the configuration of the PFC circuit according to the first embodiment. As shown in FIG. 2, the PFC circuit 105 includes an input capacitor 200, a boost coil 201, a control circuit 202, a switching element 203, a diode 204, an output capacitor 205, a first detection resistor 206, and a second detection resistor 207. The PFC circuit 105 as referred to herein is a Power Factor Correction circuit which can be also called a power factor correction circuit. In the present embodiment, this circuit is referred to as the PFC circuit 105.

The basic operation of the display device equipped with the backlight will be explained below with reference to FIG. 1. The filter circuit 102 reduces the noise component of the AC power (AC voltage) supplied from the commercial power source via the power source plug 101 and sends the AC power or the rectification circuit 103. The filter circuit 102 also functions so that the noise generated inside the display device 100 does not flow out to the commercial power source side through the power source plug 101.

The rectification circuit 103 performs full-wave rectification of the AC power (AC voltage) inputted from the filter circuit 102, converts the voltage into pulsating voltage, and inputs the pulsating voltage to the PFC circuit 105. The rectification circuit 103 may be configured by combining a plurality of diodes, or may use a bridge diode.

The input voltage detection circuit 104 detects the value of the pulsating voltage Vin inputted from the rectification circuit 103 into the PFC circuit 105 and sends the value of the input voltage Vin of the PFC circuit to the comparison unit 108.

The comparison circuit 108 determines whether or not the value of the input voltage Vin of the PFC circuit that has been acquired from the input voltage detection unit 104 exceeds a preset threshold Vth, and sends the comparison result to the backlight control circuit 113. The threshold Vth as referred to herein may be stored in a storage device such as a nonvolatile memory, or by another method. A method for setting the threshold Vth will be described below in greater detail.

The PFC circuit 105 converts the pulsating voltage Vin inputted from the rectification circuit 103 into a DC voltage and supplies electric power to the system drive circuit power source 106 and the backlight power source 107. Here, the PFC circuit 105 is a boost capacitor having a function of performing power factor correction and suppressing harmonic current. The basic operation of the PFC circuit 105 will be described below in greater detail.

The system drive circuit power source 106 converts the power of the DC voltage supplied from the PFC circuit 105 into a voltage value necessary for driving the system of the display device 100. The power is supplied to circuits (not shown in the figure) driving the image signal input unit 109, image signal processing unit 110, display control unit 111, backlight control unit 113, and other systems of the display device 100. Here, the system drive circuit power source 106 may be configured to have a function of generating voltages of a plurality of types or be configured as a plurality of power sources according to the system of the display device 100. The system drive circuit power source 106 uses a converter of a structure with insulation between the primary and secondary sides for electric shock protection.

The backlight power source 107 converts the power of the DC voltage supplied from the PFC circuit 105 into a voltage value necessary for driving the backlight 114 and supplies the converted power to the backlight 114. The backlight power source 107 may be configured to supply power to the backlight control unit 113. Here, the backlight power source 107 may be configured to have a function of generating voltages of a plurality of types according to the backlight configuration. The backlight power source 107 uses a converter in which primary and secondary sides are insulated from each other for electric shock protection.

The image signal input unit 109 receives various image signals from an external image output device (not shown in the figure) of the display device 100 or an internal storage device (not shown in the figure) of the display device 100, and inputs the received image signals to the image signal processing unit 110. The image signal input unit 109 is an inverter that can transmit image signals, such as a Display Port, HDMI, SDI, and SATA.

The image signal processing unit 110 performs the processing of converting the image signal inputted from the image signal input unit 109 into an image signal suitable for display at the display unit 112. The image signal processing referred to herein is, for example, IP conversion by which an interlace signal is converted into a progressive signal or scaling by which the angular size of the inputted image is converted into the angular size of the display unit. Further, the image signal processing unit 110 sends image information on the image signals subjected to image processing to the display control unit 111, and sends brightness information on the image signal subjected to image processing to the backlight control unit 113.

The display control unit 111 controls the display unit 112 so that the display of images based on the image signals is performed according to the characteristics of the display unit 112 on the basis of pixel information of the image signal inputted from the image signal processing unit 110.

The backlight control unit 113 receives the brightness information inputted from the image signal processing unit 110 and the comparison result acquired from the comparison unit 108 and controls the brightness of the backlight 114. A method for controlling the brightness of the backlight 114 will be described below in greater detail.

The basic operation of the PFC circuit will be explained below with reference to FIG. 2.

The PFC circuit 105 is a boost converter that converts the pulsating voltage Vin inputted from the rectification circuit 103 into the DC output voltage Vout and outputs electric power.

The input capacitor 200 acts to prevent the noise generated by the operation of the below-described switching element 203 from flowing out to the input side.

The control circuit 202 is connected to the control terminals of the switching element 203 and inputs an ON/OFF pulse signal to the control terminals. The control circuit 202 controls the ON/OFF pulse signal on the basis of the value of the voltage divided by the first detection resistor 206 and the second detection resistor 207, so that the output voltage Vout of the PFC circuit becomes a preset voltage value.

The boost coil 201 accumulates energy by the electric current flowing in from the rectification circuit 103 when the switching element 203 is ON. When the switching element 203 is OFF, the accumulated energy is released to the output side. In this case, the energy is rectified by the diode 204 and smoothed by the output capacitor 205. In the output voltage Vout of the PFC circuit applied to the output capacitor 205, the aforementioned energy is superimposed on the input voltage Vin of the PFC circuit, and therefore a boost converter is realized. The switching element 203 used herein is a semiconductor element such as a MOS-FET.

A method for setting the output voltage of the PFC circuit and a method for setting the threshold used by the comparison unit 108 will be explained below with reference to the waveform diagrams shown in FIG. 3.

Figure 3A:
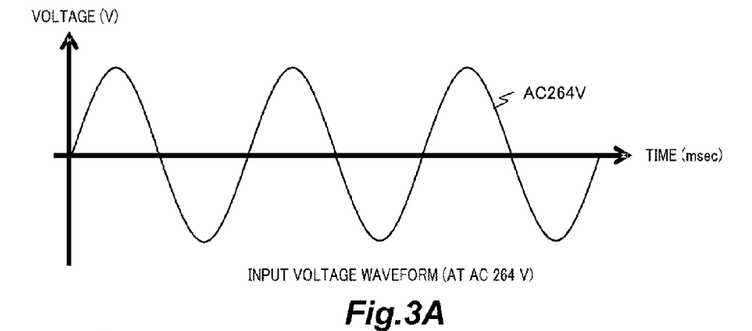
FIG. 3A shows a voltage waveform realized when the voltage of the AC power supplied from the commercial power source to the display device 100 through the power source plug 101 is at a maximum.

The waveform diagram in FIG. 3A shows a voltage waveform realized when the voltage of the AC power supplied from the commercial power source to the display device 100 through the power source plug 101 is at a maximum. The present embodiment is explained under an assumption that the maximum input voltage (effective value) of the commercial power source is AC 264 V.

Figure 3B:
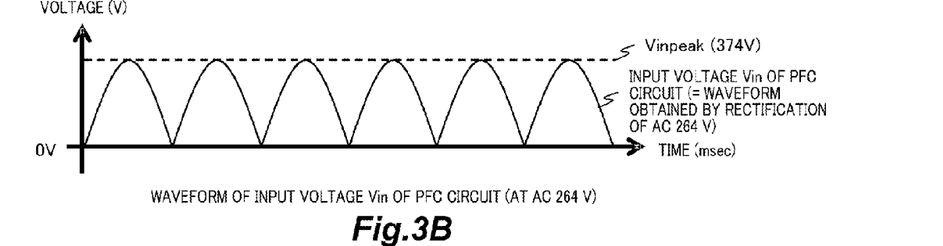
FIG. 3B shows the waveform of the input voltage Vin of the PFC circuit 105.

The waveform diagram in FIG. 3B shows the waveform of the input voltage Vin of the PFC circuit 105. The waveform shown in FIG. 3B is the waveform of the pulsating voltage rectified by the rectification circuit 103 and is the waveform of the voltage detected by the input voltage detection unit 104. Here, the peak voltage Vinpeak of the input voltage Vin of the PFC circuit is obtained by multiplying the maximum input voltage (AC 264 V) of the commercial power source by a factor of √2. The present embodiment is explained under an assumption that the peak voltage Vinpeak of the input voltage Vin of the PFC circuit is 374 V.

Since the PFC circuit 105 is constituted by a boost converter generating a DC voltage, the output voltage Vout of the PFC circuit 105 is set to a value higher than the peak voltage Vinpeak (374 V) of the input voltage Vin of the PFC circuit. In the present embodiment, the case is explained in which the output voltage Vout of the PFC circuit 105 is set to DC 380 V. The set value of the output voltage Vout of the PFC circuit 105 is not limited to this example.

Figure 3C:
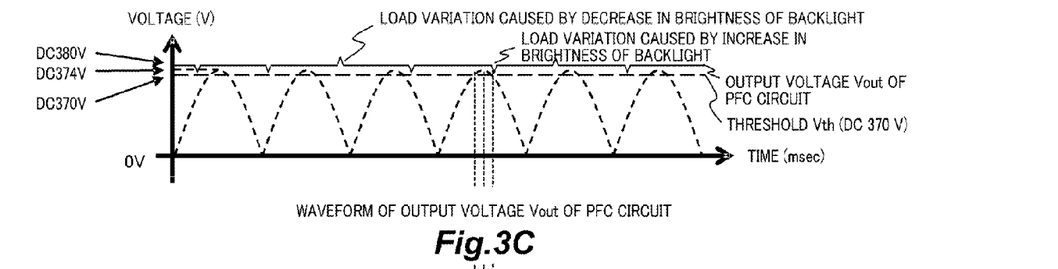
FIG. 3C illustrates the waveform of the output voltage Vout of the PFC circuit 105.

The waveform diagram shown in FIG. 3C illustrates the waveform of the output voltage Vout of the PFC circuit 105.

Figure 3D:
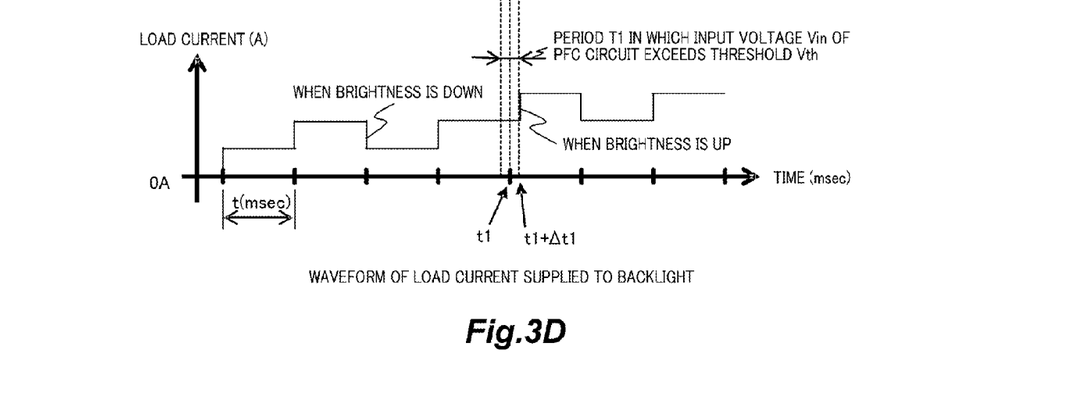
FIG. 3D illustrates a load current waveform supplied from the backlight power source 107 to the backlight 114.

The waveform diagram shown in FIG. 3D illustrates a load current waveform supplied from the backlight power source 107 to the backlight 114. The load current supplied from the PFC circuit 105 to the backlight power source 107 also changes according to the waveform diagram shown in FIG. 3D.

As shown in FIG. 3C, the waveform of the output voltage Vout of the PFC circuit 105 includes load variations caused by brightness up/down of the backlight 114 in the DC 380 V, which is the set value (target value) of the output voltage Vout. When the brightness of the backlight 114 is up, the load current rapidly rises as shown in FIG. 3D and the output voltage Vout of the PFC circuit 105 temporarily decreases as shown in FIG. 3C. When the brightness of the backlight 114 is down, the load current rapidly decreases as shown in FIG. 3D and the output voltage Vout of the PFC circuit 105 temporarily increases as shown in FIG. 3C.

The threshold Vth used by the comparison unit 108 is obtained by subtracting a maximum value Vdrop (max) of the decrease width of the voltage caused by the decrease in brightness of the backlight 114 from the set value (in this case DC 380 V) of the output voltage Vout of the PFC circuit 105. For example, when the maximum value Vdrop (max) of the decrease width of the voltage caused by the increase in brightness of the backlight 114 is DC 10 V, a voltage of DC 370 V obtained by subtracting DC 10 V from DC 380 V is set as the threshold Vth used by the comparison unit 108. However, the threshold Vth (for example, 365 V to 369 V) provided with a margin of a predetermined level (for example, 1 V to 5 V) may be also set. Since the maximum value Vdrop (max) of the decrease width of the voltage caused by the increase in brightness of the backlight 114 is determined by the configuration of the backlight 114, the response characteristic of the power source circuit, and the capacity of the capacitor, this value may be calculated from the parameters of the circuit constituting the backlight 114.

A method for controlling the brightness of the backlight in the present embodiment will be explained below.

First, the image signal processing unit 110 acquires an image signal from the image signal input unit 109 and processes the acquired signal into an image signal suitable for displaying on the display unit 112. In this case, the processed image signal becomes an image signal of a frame rate matching the characteristics of the display unit 112. Therefore, brightness information also changes with a constant period synchronized with the image signal. In FIG. 3D, the updated period of brightness information of the image signal is represented by t (msec). For example, where the frame rate of the image signal after processing is 60 fps, the updated period of brightness information becomes t=1.6 msec. As shown in FIG. 3, the period of the waveform of the input voltage Vin of the PFC circuit 105 and the updated period of brightness information do not necessarily match. Therefore, in some cases the timing at which temporary variations in the output voltage Vout occur following the variations in brightness can be close to or far from the timing of the peak of the input voltage Vin of the PFC circuit 105.

Then, the image signal processing unit 110 sets pixel information on the processed image signal to the display control unit 111 and sends the brightness information to the backlight control unit 113.

The backlight control unit 113 acquires brightness information from the image signal processing unit 110 and acquires a comparison result from the comparison unit 108. The following control is performed when a request to execute the brightness decrease control (brightness down) of decreasing the brightness of the backlight 114 is determined to be present on the basis of brightness information inputted from the image signal processing unit 110. The backlight control unit 113 controls the brightness of the backlight 114 on the basis of brightness information inputted from the image signal processing unit 110. Thus, the backlight control unit 113 executes the brightness decrease control according to the execution request.

The following control is performed when a request to execute the brightness increase control of the backlight 114 is determined to be present on the basis of brightness information inputted from the image signal processing unit 110 and when the input voltage Vin of the PFC circuit is determined to be equal to or less than the threshold Vth on the basis of the comparison result. The backlight control unit 113 executes the brightness increase control of increasing the brightness of the backlight 114 on the basis of brightness information inputted from the image signal processing unit 110.

The following control is performed when a request to execute the brightness increase control of the backlight 114 is determined to be present on the basis of brightness information inputted from the image signal processing unit 110 and when the input voltage Vin of the PFC circuit is determined to exceed the threshold Vth on the basis of the comparison result. The backlight control unit 113 performs the control such that the brightness of the backlight 114 is not increased till the input voltage Vin of the PFC circuit is determined to be equal to or less than the threshold Vth. Thus, the backlight control unit 113 does not execute the brightness increase control even when an execution request is present, delays the execution of the brightness increase control till the input voltage Vin becomes equal to or less than the threshold Vth, and executes the brightness increase control when the input voltage Vin becomes equal to or less than the threshold Vth. More specifically, changes in a current of a load is suppressed until the value of input voltage Vin becomes equal to or less than the threshold Vth.

At a point of time t1 shown in FIG. 3D, the request for backlight brightness control based on brightness information is the increase in brightness, but since the value of the input voltage Vin of the PFC circuit exceeds the threshold Vth, the brightness increase is not executed. When a time interval Δt1 elapses since the point of time t1, the value of the input voltage Vin of the PFC circuit is determined to be equal to or less than the threshold Vth, and the delayed brightness increase is executed. Thus, when the input voltage Vin of the PFC circuit is determined to exceed the threshold Vth, the change (increase) timing of the backlight brightness is temporarily shifted from the timing of the period t (msec) synchronized with the frame rate of the image signal. However, as shown in FIG. 3D, the time interval ΔT1 in which the input voltage Vin of the PFC circuit exceeds the threshold Vth is extremely short, and with the numerical values used in the present embodiment, this time interval is about 90 to 110 μsec and the effect produced on the user's viewing experience is within the allowed range. Further, when it is necessary to obtain an even shorter time interval in which the input voltage Vin of the PFC circuit exceeds the threshold Vth, the set value of the output voltage of the PFC circuit or the threshold Vth may be changed as appropriate.

Figure 4:
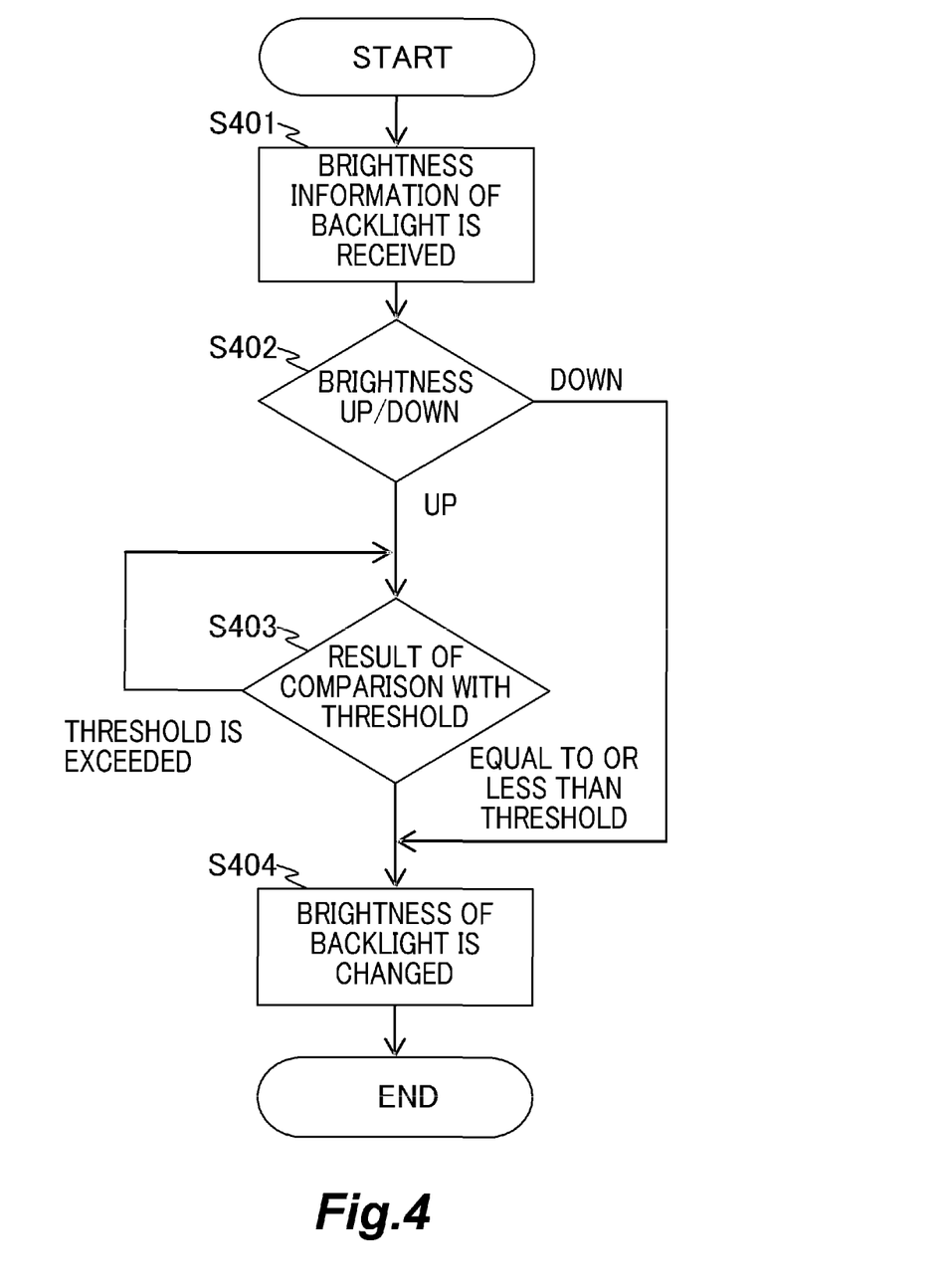
FIG. 4 is a flowchart of backlight control according to Embodiment 1.

The backlight control of the present embodiment is explained below by using the flowchart shown in FIG. 4.

In step S401, the backlight control unit 113 receives brightness information of the backlight 114 from the image signal processing unit 110 and the processing advances to step S402.

In step S402, where the brightness information of the backlight 114 is brightness down, the processing advances to step S404.

In step S402, where the brightness information of the backlight 114 is brightness up, the processing advances to step S403.

In step S403, a comparison result of the value of the input voltage Vin of the PFC circuit and the threshold Vth is acquired. When the comparison result indicates that the value of the input voltage Vin of the PFC circuit exceeds the threshold Vth, the acquisition of comparison results is repeated. When the comparison result indicates that the value of the input voltage Vin of the PFC circuit is equal to or less than the threshold Vth, the processing advances to step S404.

In step S404, the brightness of the backlight 114 is changed on the basis of brightness information of the backlight 114 received from the image signal processing unit 110, and the processing flow is ended.

In the present embodiment, an example of an image display device provided with a backlight (light source unit) is used, but the present invention can be also used for controlling any electronic device in which the output voltage of a PFC circuit is decreased by abrupt changes in the load circuit. Further, in the present embodiment, an example is explained in which the present invention is used to control a liquid crystal display device, but the present invention can be also used to control an image display device using self-emitting element such as an organic EL.

As described hereinabove, in the backlight control of the present embodiment, the period in which the value Vin of the voltage inputted to the PFC circuit exceeds the threshold Vth is controlled such as not to increase the backlight brightness. In other words, the period in which the value of the input voltage Vin exceeds the threshold Vth, fluctuations of load current are suppressed. As a result, the decrease in the output voltage Vout of the PFC circuit in the vicinity of the peak voltage Vinpeak of the input voltage Vin of the PFC circuit is prevented, and therefore the set value of the output voltage Vout can be reduced. Therefore, a small-size output capacitor with a low rated voltage can be used for the PFC circuit, and therefore the power source for a display device can be miniaturized. Further, since the difference in potential between the primary side and secondary side is decreased as a result of the lowered output voltage Vout of the PFC circuit, the insulation distance can be shortened. Therefore, the power source for a display device can be miniaturized.

Embodiment 2

The second embodiment of the present invention is explained below with reference to the appended drawings.

In the present embodiment, an example is explained in which the brightness change timing of the backlight is shifted within a period in which a difference between the detected value of the voltage inputted to the PFC circuit and the detected value of the output voltage of the PFC circuit is equal to or less than a predetermined value. In the present embodiment, by contrast with Embodiment 1, the backlight control is performed on the basis of a difference between input and output voltages of the PFC circuit. Therefore, the backlight brightness can be changed at a more accurate timing.

The constituted elements same as those in Embodiment 1 are assigned with like reference numerals and names and the detailed explanation thereof is herein omitted. The attention is thus focused on the features different from those of Embodiment 1.

Figure 5:
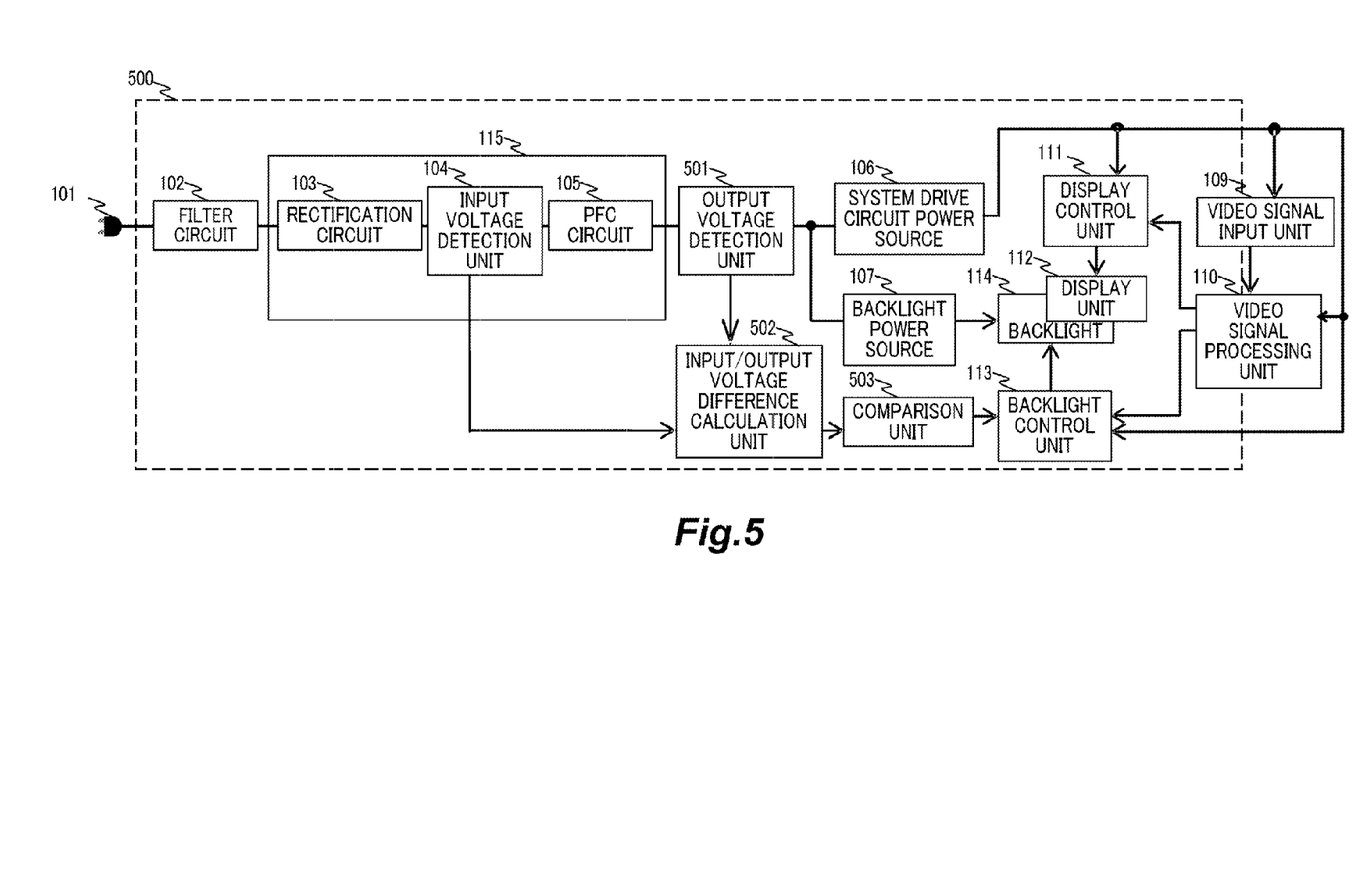
FIG. 5 is a block diagram illustrating the schematic configuration of the display device according to Embodiment 2.

FIG. 5 is a block diagram illustrating the schematic configuration of an image display device that carries a backlight according to the present embodiment. As shown in FIG. 5, the display device 500 is configured by adding an output voltage detection unit 501 and a difference calculation unit 502 to the display device 100 that carries a backlight according to Embodiment 1 and by using a comparison unit 503 instead of the comparison unit 108.

The basic operation of the image display device carrying the backlight will be explained below with reference to FIG. 5.

The input voltage detection unit 104 detects the value of the pulsating voltage Vin inputted from the rectification circuit 103 to the PFC circuit 105 and sends the value of the inputted voltage Vin of the PFC circuit to the difference calculation unit 502.

The output voltage detection unit 501 detects the value of the output voltage Vout of the PFC circuit 105 and sends the value of the output voltage Vout of the PFC circuit 105 to the difference calculation unit 502.

The difference calculation unit 502 calculates a difference value Vdif between the value of the input voltage Vin of the PFC circuit acquired from the input voltage detection unit 104 and the value of the output voltage Vout of the PFC circuit 105 acquired from the output voltage detection unit 501, and sends the calculated difference value Vdif to the comparison unit 503.

The comparison unit 503 determines whether or not the difference value Vdif between the input and output voltages acquired from the difference calculation unit 502 exceeds a predetermined value Vdef that has been set in advance, and sends the comparison result to the backlight control unit 113. A method for setting the predetermined value Vdef is described below in greater detail.

The backlight control unit 113 receives brightness information inputted from the image signal processing unit 110 and the comparison result acquired from the comparison unit 503 and controls the brightness of the backlight 114. A method for controlling the brightness of the backlight 114 is described below in greater detail.

The basic operation of the PFC circuit and a method for setting the output voltage of the PFC circuit are the same as in the first embodiment and the explanation thereof is herein omitted.

A method for setting the predetermined value used by the comparison unit 503 is explained below using the waveform diagram shown in FIG. 6.

Figure 6A:
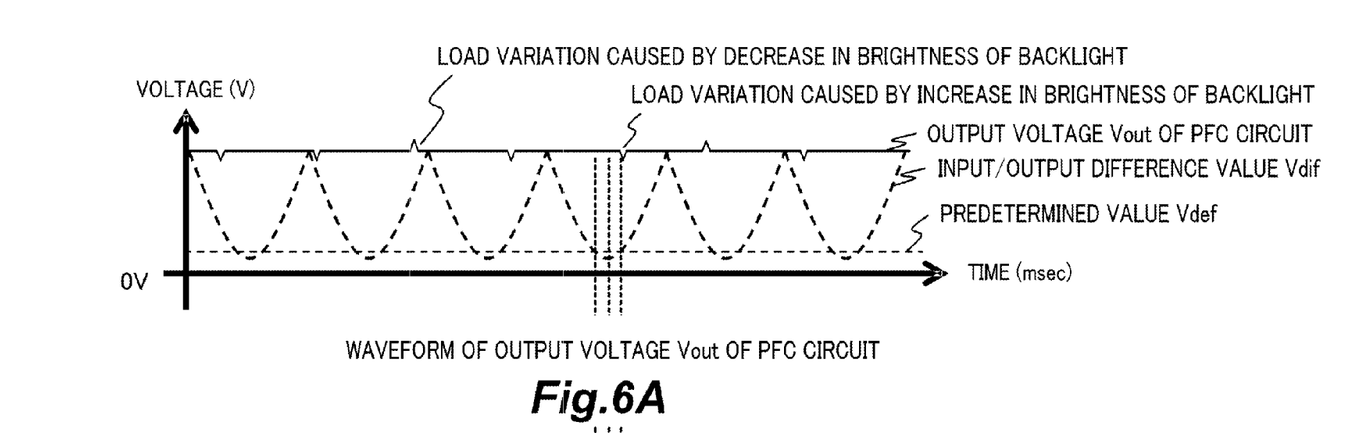
FIG. 6A illustrates the waveform of the output voltage Vout of the PFC circuit 105.

The waveform diagram shown in FIG. 6A illustrates the waveform of the output voltage Vout of the PFC circuit 105.

Figure 6B:
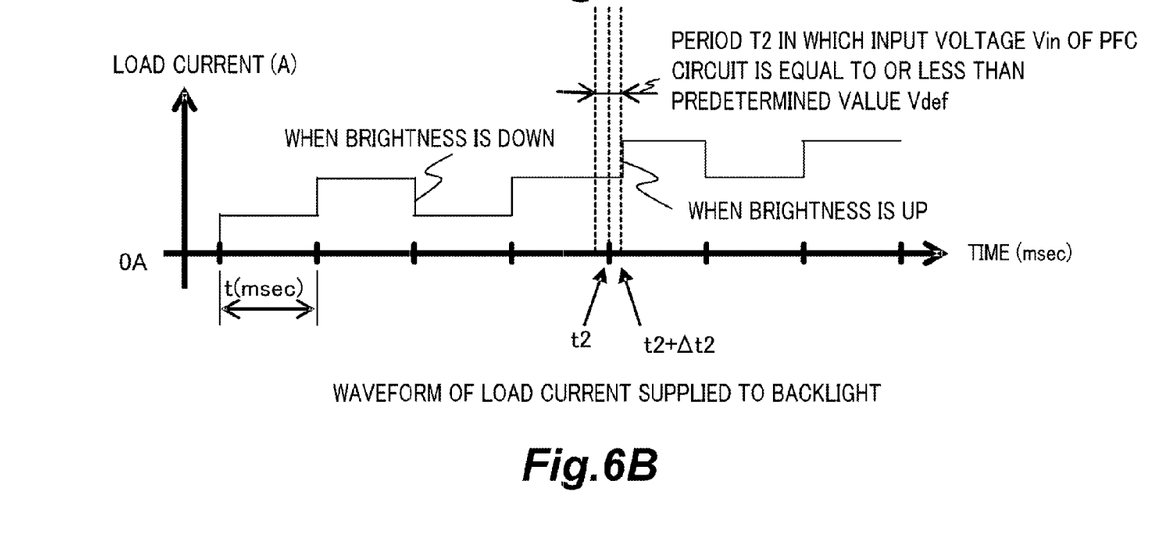
FIG. 6B illustrates a load current waveform supplied from the backlight power source 107 to the backlight 114.

The waveform diagram shown in FIG. 6B illustrates a load current waveform supplied from the backlight power source 107 to the backlight 114. The load current supplied from the PFC circuit 105 to the backlight power source 107 varies according to the load current waveform shown in the waveform diagram in FIG. 6B.

The predetermined value Vdef used by the comparison unit 503 is the maximum value Vdrop (max) of the decrease width of the output voltage Vout of the PFC circuit 105 caused by the increase in brightness of the backlight 114. For example, when the maximum value Vdrop (max) of the decrease width of the output voltage Vout caused by the increase in brightness of the backlight 114 is DC 10 V, DC 10 V is set as the predetermined value Vdef used by the comparison unit 503. Since maximum value Vdrop (max) of the decrease width of the output voltage Vout caused by the increase in brightness of the backlight 114 is determined by the configuration of the backlight 114, the response characteristic of the power source circuit, and the capacity of the capacitor, this value may be calculated from the parameters of the circuit constituting the backlight 114.

A method for controlling the backlight brightness in the present embodiment is explained below.

The backlight control unit 113 acquires brightness information from the image signal processing unit 110 and acquires the comparison result from the comparison unit 503. When the brightness information inputted from the image signal processing unit 110 indicates the decrease in brightness, the backlight control unit 113 controls the brightness of the backlight 114 according to the brightness information inputted from the image signal processing unit 110.

The following control is performed when the brightness information inputted from the image signal processing unit 110 indicates the increase in brightness and the difference value Vdif between the input and output voltages in the comparison result is determined to exceed the predetermined value Vdef. The backlight control unit 113 controls the brightness of the backlight 114 according to the brightness information inputted from the image signal processing unit 110.

The following control is performed when the brightness information inputted from the image signal processing unit 110 indicates the increase in brightness and the difference value Vdif between the input and output voltages in the comparison result is determined to be equal to or less than the predetermined value Vdef. The backlight control unit 113 controls the brightness of the backlight 114 such as to prevent the brightness from rising till the difference value Vdif between the input and output voltages is determined to exceed the predetermined value Vdef.

For example, at a point of time t2 shown in FIG. 6B, the request for backlight brightness control based on brightness information is the increase in brightness, but since the value of the difference Vdif between the input voltage Vin and output voltage Vout of the PFC circuit is equal to or less than the predetermined value Vdef, the brightness increase is not executed. When a time interval Δt2 elapses since the point of time t2, the value of the difference Vdif between the input voltage Vin and output voltage Vout of the PFC circuit is determined to exceed the predetermined value Vdef, and the delayed brightness increase in executed. Thus, when the value of the difference Vdif between the input and output voltages of the PFC circuit is determined to be equal to or less than the predetermined value Vdef, the change (increase) timing of the backlight brightness is temporarily shifted from the timing of the period t (msec) synchronized with the frame rate of the image signal. However, as shown in FIG. 6B, the time interval ΔT2 in which the difference Vdif between the input and output voltages is equal to or less than the predetermined value Vdef is extremely short, and with the numerical values used in the present embodiment, this time interval is about 90 to 110 μsec and the effect produced on the user's viewing experience is within the allowed range. Further, when it is necessary to obtain an even shorter time interval in which the difference Vdif between the input and output voltages is equal to or less than the predetermined value Vdef, the set value of the output voltage of the PFC circuit or the predetermined value Vdef may be changed as appropriate.

Figure 7:
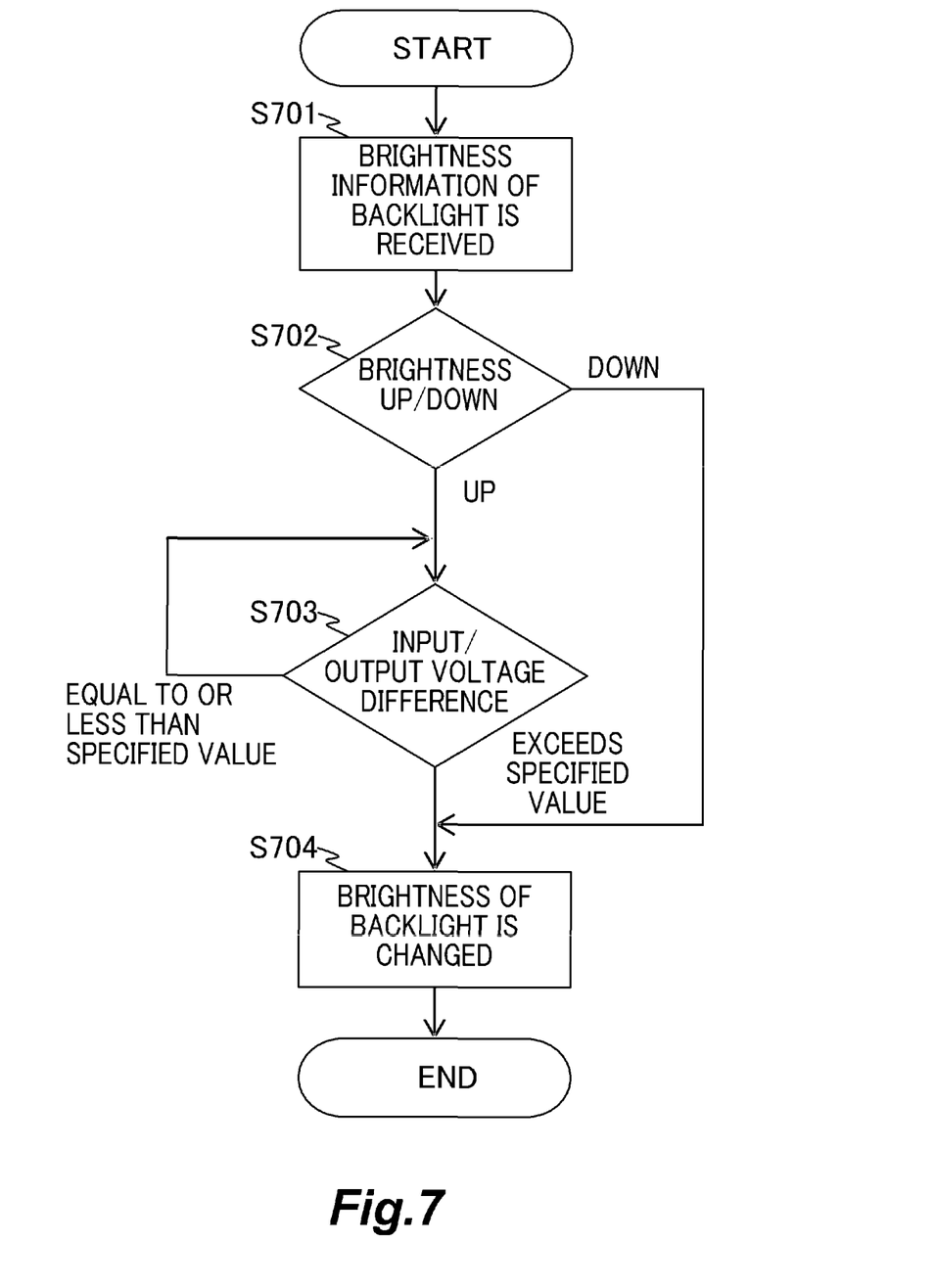
FIG. 7 is a flowchart of backlight control according to Embodiment 2.

The backlight control of the present embodiment is explained below by using the flowchart shown in FIG. 7.

In step S701, the backlight control unit 113 receives brightness information of the backlight 114 from the image signal processing unit 110 and the processing advances to step S702.

In step S702, where the brightness information of the backlight 114 is brightness down, the backlight control unit 113 advances to step S704.

In step S702, where the brightness information of the backlight 114 is brightness up, the backlight control unit 113 advances to step S703.

In step S703, the backlight control unit 113 acquires a comparison result of the difference value Vdif between the input and output voltages and the predetermined value Vdef. When the comparison result indicates that the difference value Vdif between the input and output voltages is equal to or less than the predetermined value Vdef, the backlight control unit 113 repeats the acquisition of comparison results. When the comparison result indicates that the difference value Vdif between the input and output voltages exceeds the predetermined value Vdef, the backlight control unit 113 advances to step S704.

In step S704, the brightness of the backlight 114 is changed on the basis of brightness information of the backlight 114 received from the image signal processing unit 110, and the processing flow is ended.

As described hereinabove, in the present embodiment, the period in which the difference between the detected value of the inputted voltage and the detected value of the outputted voltage of the PFC circuit is equal to or less than the threshold is controlled such as not to increase the backlight brightness. As a result, a period in which the output voltage can be lower than the input voltage can be accurately determined, and the backlight brightness can be controlled at a more accurate timing so as to prevent the output voltage from being lower than the input voltage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-018190, filed on Jan. 31, 2012, and Japanese Patent Application No. 2012-254183, filed on Nov. 20, 2012, which are hereby incorporated by reference herein in their entirety.

What is claimed is:

1. A light source device comprising:
   a boost-type conversion unit configured to convert an input AC voltage into a DC voltage;
   a detection unit configured to detect a voltage value of the input AC voltage; and
   a control unit configured to control a brightness of a light source unit on the basis of an input image signal, wherein
   in a case when there is a request to execute brightness increase control of the light source unit in a period in which a difference between an output voltage value of the conversion unit and the voltage value detected by the detection unit is equal to or less than a threshold, the control unit executes the brightness increase control after this period.

2. The light source device according to claim 1, wherein the conversion unit has:
   a rectification circuit that performs full-wave rectification of the inputted AC voltage; and
   a boost-type power factor correction circuit that converts the full-wave-rectified AC voltage into a DC voltage, and
   the detection unit detects a voltage value of a voltage to be inputted to the power factor correction circuit.

3. The light source device according to claim 1, wherein
   in a case when there is a request to execute brightness increase control of the light source unit in a period in which the voltage value detected by the detection unit exceeds the threshold, the control unit executes the brightness increase control after this period.

4. The light source device according to claim 3, wherein
   the threshold is a value determined on the basis of a target value of the output voltage of the conversion unit that has been set in advance and a decrease width of the output voltage of the conversion unit that can be generated in the case where the brightness increase control is executed.

5. The light source device according to claim 1, wherein
   the threshold is a value determined on the basis of a decrease width of the output voltage of the conversion unit that can be generated in the case where the brightness increase control is executed.

6. The light source device according to claim 1, wherein the light source unit is a backlight of a liquid crystal display device.

7. A control method for a light source device provided with a boost-type conversion unit configured to convert an input AC voltage into a DC voltage,
   the control method comprising:
   a detection step of detecting a voltage value of the input AC voltage; and
   a control step of controlling a brightness of a light source unit on the basis of an input image signal, wherein
   in the control step, in a case when there is a request to execute brightness increase control of the light source unit in a period in which a difference between an output voltage value of the conversion unit and the voltage value detected in the detection step is equal to or less than a threshold, the brightness increase control is executed after this period.

8. The control method for a light source device according to claim 7, wherein the conversion unit has:
   a rectification circuit that performs full-wave rectification of the input AC voltage; and
   a boost-type power factor correction circuit that converts the full-wave-rectified AC voltage into a DC voltage, and
   in the detection step, a voltage value of a voltage inputted to the power factor correction circuit is detected.

9. The control method for a light source device according to claim 7, wherein
   in the control step, in a case when there is a request to execute brightness increase control of the light source unit in a period in which the voltage value detected in the detection step exceeds the threshold, the brightness increase control is executed after this period.

10. The control method for a light source device according to claim 9, wherein
    the threshold is a value determined on the basis of a target value of the output voltage of the conversion unit that has been set in advance and a decrease width of the output voltage of the conversion unit that can be generated in the case where the brightness increase control is executed.

11. The control method for a light source device according to claim 7, wherein the threshold is a value determined on the basis of a decrease width of the output voltage of the conversion unit that can be generated in the case where the brightness increase control is executed.

12. The control method for a light source device according to claim 7, wherein
the light source unit is a backlight of a liquid crystal display device.

* * * * *